(12) United States Patent
Seitz, Jr. et al.

(10) Patent No.: US 10,093,161 B1
(45) Date of Patent: Oct. 9, 2018

(54) PORTABLE RAIN AND SUN SHIELD FOR A COVERED GOLF CART

(71) Applicant: SWIC, LLC, Virginia Beach, VA (US)

(72) Inventors: Thomas M. Seitz, Jr., Virginia Beach, VA (US); Michael E. Walker, Virginia Beach, VA (US); Philip C. Hollowell, Virginia Beach, VA (US)

(73) Assignee: SWIC, LLC, Virginia Beach, VA (US)

(*) Notice: Subject to any disclaimer, the term of this patent is extended or adjusted under 35 U.S.C. 154(b) by 0 days.

(21) Appl. No.: 15/879,943

(22) Filed: Jan. 25, 2018

(51) Int. Cl.
*B60J 11/00* (2006.01)
*E04H 15/06* (2006.01)
*B60J 7/10* (2006.01)

(52) U.S. Cl.
CPC ............... *B60J 11/00* (2013.01); *B60J 7/102* (2013.01); *E04H 15/06* (2013.01)

(58) Field of Classification Search
CPC .................................. B60J 11/00; E04H 15/06
USPC .................................. 135/88.01, 88.05, 88.07
See application file for complete search history.

(56) References Cited

U.S. PATENT DOCUMENTS

| 1,659,825 A * | 2/1928 | MacKay | E04H 15/06 135/143 |
|---|---|---|---|
| 2,859,756 A * | 11/1958 | Barnes | E04H 15/06 135/114 |
| 2,948,288 A * | 8/1960 | Nelson | B60P 3/343 135/120.3 |
| 3,952,758 A * | 4/1976 | Addison | B60P 3/343 135/141 |
| 3,957,301 A * | 5/1976 | Huber | B60J 11/00 135/87 |
| 4,848,827 A * | 7/1989 | Ou | B60J 11/00 135/88.07 |
| 4,924,896 A | 5/1990 | Carter | |
| 5,063,953 A | 11/1991 | Wu | |
| D330,630 S | 11/1992 | Loden | |
| 5,287,871 A | 2/1994 | Trice | |
| 5,762,308 A | 6/1998 | Bryan | |
| 6,164,302 A | 12/2000 | Ko | |
| 6,199,932 B1 | 3/2001 | Welsh et al. | |
| 6,227,603 B1 | 5/2001 | Brock | |
| 6,230,727 B1 | 5/2001 | Chen | |
| 6,354,315 B1 | 3/2002 | Liu | |

(Continued)

FOREIGN PATENT DOCUMENTS

| GB | 2423058 A | 8/2006 | |
|---|---|---|---|
| WO | WO-9425303 A1 * | 11/1994 | .............. B60J 11/00 |

(Continued)

OTHER PUBLICATIONS

"Bag Canopy for Golf Cart," Bag Diaper Images, (retrieved from <http://bagdiaperimages.blogspot.com/2013/07/bag-canopy-for-golf-cart.html>) dated Jul. 26, 2013.

(Continued)

*Primary Examiner* — Noah Chandler Hawk
(74) *Attorney, Agent, or Firm* — Greenspoon Marder LLP (57) ABSTRACT

A portable, light weight sun and rain shield for golfers that fits in the umbrella pocket of a golf bag and is positioned on top of a golf cart which when opened extends beyond the width of the golf cart roof to protect the golfer from sun and rain. A nylon or fabric cover provides a shield extending from approximately 2 to 10 feet on each side of the golf cart's roof. A device that is easily opened and closed.

13 Claims, 5 Drawing Sheets

(56) References Cited

U.S. PATENT DOCUMENTS

| | | | |
|---|---|---|---|
| D478,859 S | 8/2003 | Tyrer | |
| 6,761,391 B2 | 7/2004 | Winkler | |
| 6,935,674 B1* | 8/2005 | Campos | B60J 11/00 296/136.1 |
| 7,243,990 B1 | 7/2007 | Wahl | |
| 7,344,182 B1* | 3/2008 | Weddell | E04F 10/0633 160/67 |
| 7,448,666 B2 | 11/2008 | Tyrer | |
| 7,677,634 B2 | 3/2010 | Flynn | |
| 8,069,899 B2 | 12/2011 | Nation | |
| 8,113,259 B2 | 2/2012 | Tessmer | |
| 8,845,004 B2 | 9/2014 | DeVoss, Jr. | |
| 8,960,212 B2* | 2/2015 | Majer | B60J 11/00 135/88.07 |
| 9,004,574 B1 | 4/2015 | Fisher | |
| 9,254,734 B2 | 2/2016 | Held | |
| 9,783,033 B2* | 10/2017 | Wang | B60J 11/02 |
| 2006/0124164 A1* | 6/2006 | Pacheco | B60J 11/02 135/88.05 |
| 2006/0162873 A1* | 7/2006 | Dao | B60J 11/00 160/122 |
| 2006/0219278 A1 | 10/2006 | Lohman | |
| 2016/0303951 A1 | 10/2016 | Masih et al. | |

FOREIGN PATENT DOCUMENTS

| | | |
|---|---|---|
| WO | 2015/121694 A1 | 8/2015 |
| WO | 2016/195385 A1 | 12/2016 |
| WO | 2016/207791 A1 | 12/2016 |

OTHER PUBLICATIONS

"Golf Cart Club Rain Protector," Frugal Dougal's Golf Cart Accessories, (retrieved from <https://web.archive.org/web/20120421141712/http://www.frugaldougalsgolf.com:80/clubprotector> on Jan. 22, 2018) dated Apr. 21, 2012, 3 pages.

Club Protector, "Introducing the New Patent Pending Retractable Enclosure," The Original Club Protector, (retrieved from <https://web.archive.org/web/20130907165514/http://www.clubprotector.com/> on Jan. 22, 2018) dated Sep. 7, 2013, 2 pages.

"Enclosure—Sunbrella Cloth," Golf Cart Parts Direct, (retrieved from <https://web.archive.org/web/20160419212710/https://golfcartpartsdirect.com/index.php? app=ecom&ns=catshow&ref=495&sid=4v0x60u7igy522p730vp85143321791e> on Jan. 22, 2018) dated Apr. 19, 2016, 2 pages.

* cited by examiner

PORTABLE RAIN AND SUN SHIELD FOR A COVERED GOLF CART

BACKGROUND

Golf carts, even covered golf carts, do not provide adequate protection to their occupants against sun and rain. Some after-market products have panels that drop down to cover the sides of a cart and others form a canopy covering the entire cart. These devices are often cumbersome and interfere with ingress to and egress from the golf cart. In addition, most of these devices are not easily removable or portable; and are hard to install.

The primary carrier used by golfers is a golf bag. Typically, everything a golfer needs is transported in a golf bag, which fits on the back of a golf cart. It is inconvenient to require a golfer to transport additional bags or gear when golfing.

What is needed is a light weight, portable and self-supporting rain and sun shield that can be fastened to the roof of a golf cart that includes an awning or canopy wider than the golf cart that will not interfere with the golfer's ingress to and egress from a golf cart but still offers protection from sun and rain overhead as well as sideways sun and rain for golfers sitting in the cart. What is further needed is a rain and sun shield that can be easily attached and removed from a golf cart that will conveniently fit in the umbrella pocket of a golf bag.

SUMMARY

The disclosed device is a portable, lightweight sun and rain shield that is placed on top of a golf cart and is supported by a main support rod that rests on the roof of the golf cart parallel to the length of the golf cart. The main support rod is held in place using stabilizing bars and straps that hold the device against the roof of the golf cart. In one embodiment, the device has accordion-like extension arms that are in multiple segments to easily expand away in a perpendicular direction away from the main support rod across the width of the golf cart's roof. In one embodiment, the extension arm segments include an inner segment, an outer segment and a perimeter support rod segment. The outer segments of the extension arms are connected to the perimeter support rod segment on each side of the golf cart for at least two extension arms and are parallel to the main support rod. The perimeter support rod forms the outside perimeter and frame support for the device and cover. In one position the arms extend to the golf cart roofline on each side of the golf cart. In another embodiment the arms extend beyond the width of the golf cart's roof as much as 120 inches. A nylon or fabric cover is attached to the main support rod, extension arms and perimeter support rods so that when the arms are fully extended the device provides golfers in the cart a shield from sun and rain. In one embodiment, the cover is attached to the main support rod, extension arms and perimeter support rods by fasteners, rivets, sewn sleeves, Velcro, hooks, snaps, loop and fasteners, ties, and other such fasteners as known in the art.

In one embodiment, the device comprises a main support rod, having an upper side and a lower side with at least two stabilizer arms, attached to the lower side of the main support rod by a mechanical fastener that allows the stabilizer arms to rotate from a position parallel to the main support rod to a position perpendicular to the main support rod. The fasteners will allow the stabilizer arms to rotate and may be a screw, pin, pivot, bracket, swivel bracket or other such connector as known to those of ordinary skill in the art. The device also has at least two extension arms, each attached to the main support rod in similar fashion to the stabilizer arms. The extension arms are also attached to the lower side of the main support rod. The device includes a cover attached to the at least two extension arms and to the upper side of the main support rod and at least two straps that wrap around the golf cart roof. Each strap is attached at one end to the stabilizer arms and at the other end to each other using fasteners to further secure the device to the roof of the golf cart.

The device is portable, lightweight and is easily attached to and removed from the roof of a golf cart. In one embodiment, the device has a locking mechanism on the extension arms, which can lock in one or more positions depending on the desired coverage. In one embodiment, the extension arms are manually opened. In another, the extension arms may be opened and closed using a screw and hand crank. In another embodiment, the operation can be motorized and or remote controlled. In a different embodiment, the device uses tent poles as the multiple segments of the extension arms, with each of the inner segments attached to the lower side of the main support rod.

In another embodiment, the device includes a main support rod, having an upper side and a lower side; at least two stabilizer arms having a right and left side, each rotatably attached to the lower side of the main support rod; at least two extension arms having an inner, an outer, and a perimeter support rod segment each segment having a proximal and distal end; wherein the proximal end of the inner segment is attached to the lower side of the main support rod and the distal end of the inner segment is connected to the proximal end of the outer segment and the distal end of the outer segment is connected to the perimeter support rod segment for each of the at least two extension arms; a cover attached to the upper side of the main support rod and the perimeter support rods; at least two straps having a proximal and distal end, wherein the proximal end of each strap is attached to the right and left side of each stabilizer arm and each distal end of each strap has a fastener to attach the distal ends of the at least two straps together; wherein the device is placed on top and near center of a golf cart roof having a top, an underside, a front, a back, a left and a right side; said placement on the roof is along the lower side of the main support rod so the extension arms and cover can expand to overhang the roof of the golf cart up to about 24 inches on each side, and wherein the straps wrap around the sides of the golf cart roof and attach to each other on the underside of the golf cart roof to secure the device to the golf cart roof.

The disclosed device is easily retractable. The accordion-like extension arms retract adjacent to the main support rod by pivoting the extension arms into a position parallel with the length of the main support rod. The cover folds or crumples inward with the extension arms. The straps and fasteners can be used to secure the device in its collapsed position, and the collapsed or unexpanded device is approximately the same diameter and length as a large golf umbrella so that it fits in the umbrella slot, pouch, compartment, holder, or pocket of a standard golf bag. In one embodiment, the unexpanded device has a diameter of between 2 and 3.5 inches. In one embodiment, the cover extends at least 18 inches beyond each side of the golf cart. In another embodiment, the cover extends at least 24 inches beyond each side of the golf cart. In one embodiment, the cover is angled from the main support rod downward toward each side of the golf cart so that water will drain away from the main support rod. Other embodiments can include a carrying bag equipped with a shoulder strap, golf bag mounting clip, Velcro strap or other suitable attachment for mounting on or connecting to a golf bag while not installed on the golf cart.

In one embodiment, the device provides shelter to occupants of a golf cart from sun and rain when deployed on top of a golf cart. In another embodiment, the device can shelter people standing or sitting next to a golf cart from sun and rain. In one embodiment, the device can be deployed on an ATV or other small transport vehicle instead of a golf cart.

These and other advantages of the invention will be further understood and appreciated by those skilled in the art by reference to the following written specification, claims and appended drawings.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

DETAILED DESCRIPTION

It is to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Further, the invention presented herein may be described in terms of functional block components and processes, which may be realized in a variety of different forms to perform the specified functions and processes.

Figure 1:
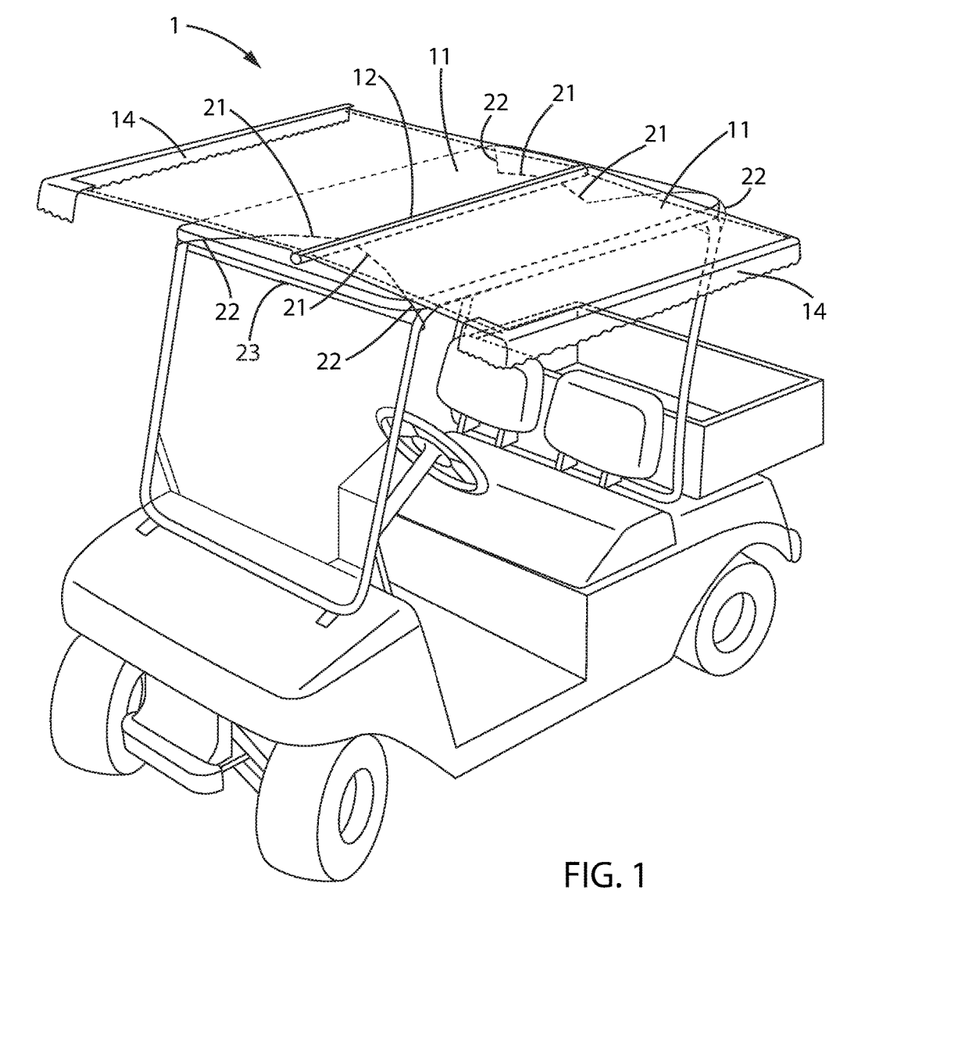
FIG. 1 is a perspective view of the extended device attached to a golf cart according to selected embodiments of the current disclosure.

In one embodiment of the disclosed device 1, as shown in FIG. 1, the following components are employed: a removable cover 11 that provides the device's sun and rain protection; a main support rod 12; and a valance 14 that hangs down along the edges of cover 11. When positioned on a golf cart, the cover has arms that extend outward and wider than the sides of a golf cart and front and rear ends that can reversibly face in the direction of the front and rear end of the golf cart. The cover 11 can be of any material, such as canvas, nylon, polyester, cotton, linen, tencel, hemp, or any synthetic or natural fiber. In one embodiment, the cover material is treated to be waterproof. In another embodiment the cover may be washable. In one embodiment, nylon or polyester is used because of its durability and low weight. In one embodiment, the cover 11 is a rectangle of approximately 84 to 96 inches wide from side to side and 44 inches long from front to back (with directional references based on the position of the cover when installed on a golf cart). The roof of a typical two seat golf cart is approximately 48 inches wide and 60 inches long. In one embodiment of the device, the cover 11 is wide enough to extend 18 to 24 inches out from each side of the golf cart roof. In another embodiment, the cover 11 is up to 120 inches wider than each side of the golf cart's roof. In one embodiment, the cover 11 is between 42 and 46 inches long, the approximate length of a large golf umbrella. In another embodiment, the cover 11 is the approximate length of a golf cart's roof. The main support rod 12 can be a rod or pipe and can be made of metal, plastic, fiberglass, composite or other suitable light weight and strong material. The main support rod 12 can be held in place by straps, clamps, suction pads, suction cups or other suitable fasteners to hold the main support rod 12 from sliding on the roof of the golf cart.

The main support rod 12 bifurcates the width of the cover. In one embodiment; the main support rod 12 is located exactly halfway between the extending sides or width of the cover 11. In one embodiment, the extending ends of the cover 11 have a 0 to 12 inch valence 14 that hangs freely from the extending ends of the cover 11 to provide additional sun and rain protection to the golfers in the cart. In another embodiment, that portion of the cover 11 that extends out from the sides of the golf cart's roof also has a 0 to 12 inch valence that hangs down from the front and rear ends of the cover 11. In another embodiment there is a 0 to 36 inch valence that hangs vertically from the outer perimeter of the cover. In one embodiment the valence hangs vertically from the cover only along the sides of the cart. In another embodiment, the valence hangs vertically from the cover along the sides of the cart and partially along the front side of the cart. In another embodiment, the valence is attached to the cover along the entire perimeter of the cover.

Figure 2:
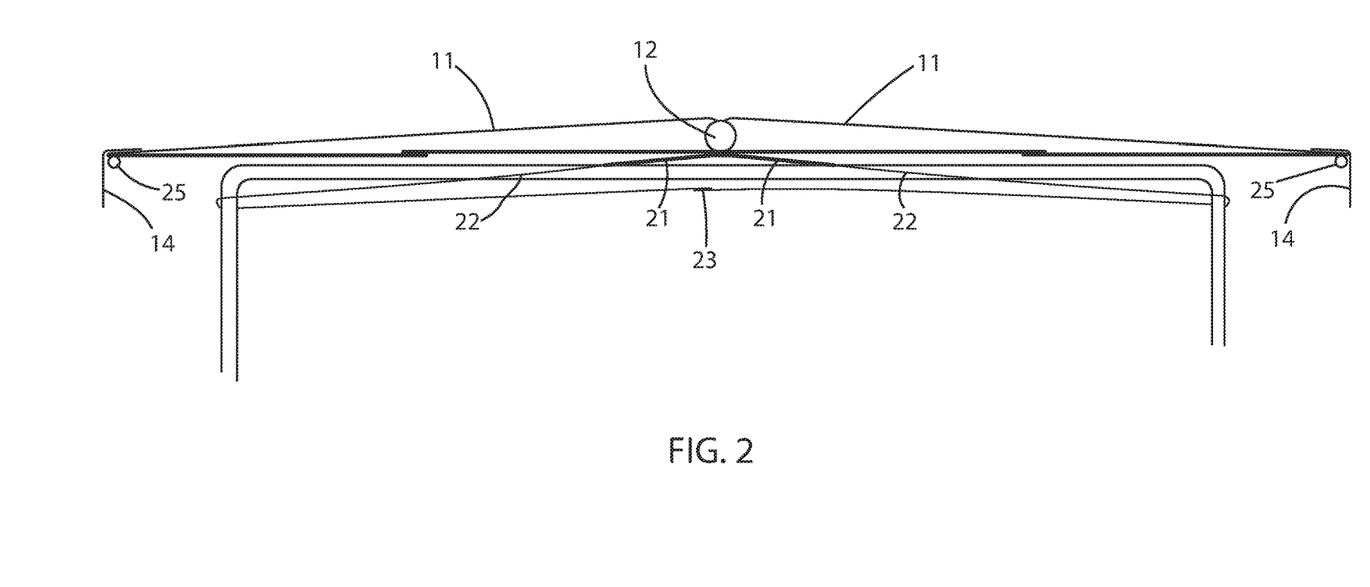
FIG. 2 is a rear plan view of the extended device according to selected embodiments of the current disclosure.

In one embodiment of the disclosed device 1, as shown in FIG. 2, the following additional components are employed: stabilizer arms 21 supporting the main support rod 12; straps 22 attached to the stabilizer arms 21, the stabilizer arms 21 having one end attached to the main support rod 12 and an opposite end with Velcro, metal or plastic snap, plastic side release, metal slide/D-ring release or other suitable fasteners 23 on the straps 22 that connect the straps 22 together. In one embodiment, two stabilizer arms 21 are attached to main support rod 12 by a mechanical fastener such as but not limited to a screw, pin, pivot, bracket, swivel bracket or other connector 13. In one embodiment, the fastener for the stabilizer arms allows the stabilizer arms to rotate from a position parallel to the main support rod to a position perpendicular to the main support rod. Each stabilizer arm 21 is attached at one end to the connector 13 in such a way that the stabilizer arms can rotate at least 90 degrees on the connector 13. In another embodiment, at least one stabilizer arm 21 is attached to the main support rod 12 at each connector 13, each stabilizer arm 21 being attached at its center to the connector 13. In one embodiment, the device has four stabilizer arms; two on each side of the main support rod connected to the main support rod which is the center point of the stabilizer arms. One end of each of the four stabilizer arms 21 are attached to the main support rod by rotatable mechanical fasteners 13. In an embodiment with three connectors, six stabilizer arms can be used. In one embodiment, the device has two stabilizer arms 21, and each stabilizer arm 21 connects approximately halfway down its length to connector 13. In such an embodiment, each arm rotates around the connector 13. In another embodiment, the device uses a non-swivel bracket that allows the stabilizer arms to rotate without moving the bracket. In another embodiment, the device uses an attachment that is not a bracket to connect the stabilizer arms to the main support rod.

Figure 3:
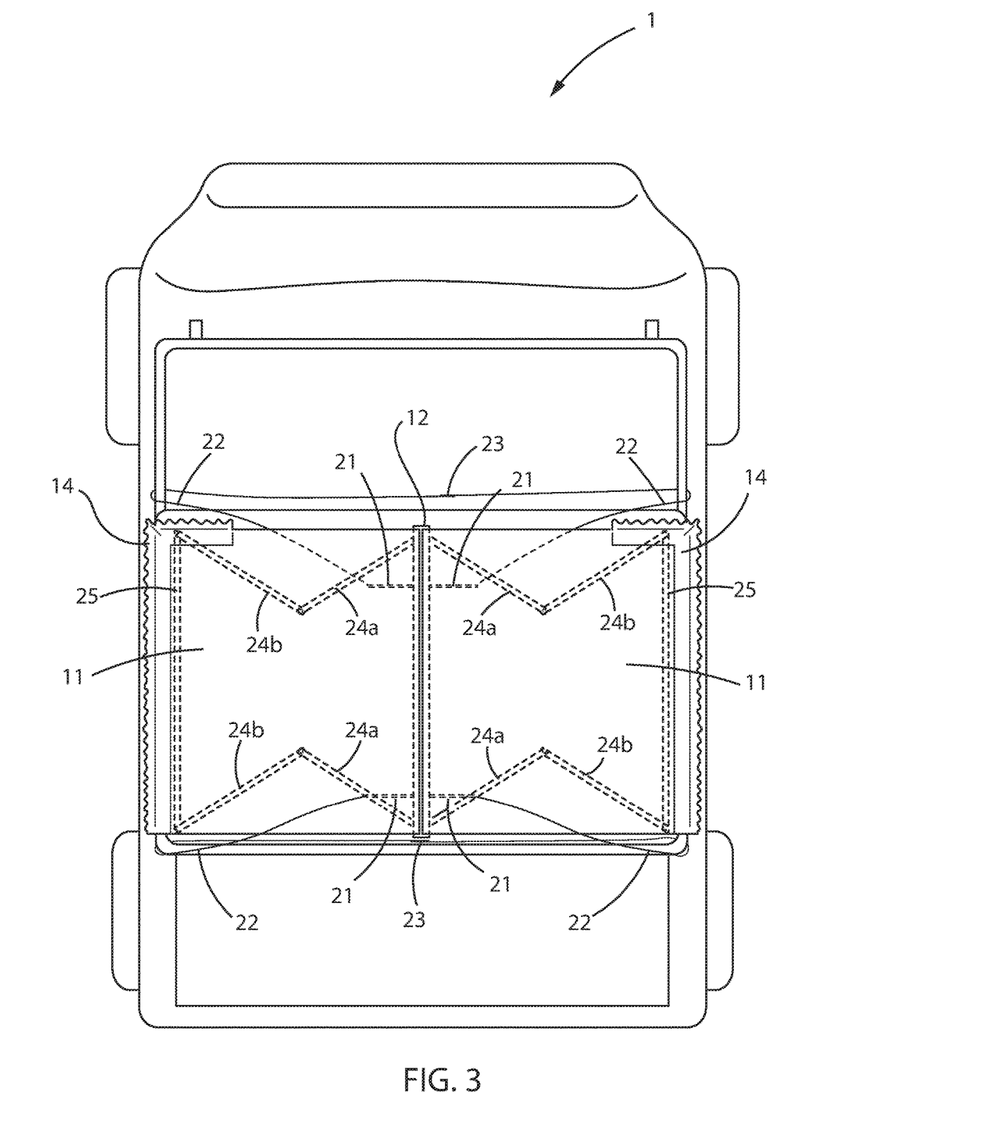
FIG. 3 is a top plan view of the partially retracted device according to selected embodiments of the current disclosure.

In the embodiment of FIG. 3, accordion-like extension arms 24 also attach to the main support rod 12 using fasteners similar those used to attach the stabilizer arms to the main support rod. In one embodiment these are mechanical fasteners such as but not limited to hinge pins with retaining rings, screws, pins, pivots, brackets, swivel brackets generally referred to as connectors 15. In one embodiment, the accordion-like extension arms 24 attach to the same connectors (not shown) on the main support rod 12 as the stabilizer arms 21. Each extension arm 24 is made of a light weight but strong rod or pipe that is generally of a smaller diameter than the main support rod 12. In one embodiment, two extension arms 24 attach to each connector 15 and extend in opposite directions. In such an embodiment, the extension arms have an inner 24a, an outer 24b segment, and a perimeter support rod segment 25 each segment having a proximal and distal end; wherein the proximal end of the inner segment is attached to the lower side of the main support rod and the distal end of the inner segment 24a is connected to the proximal end of the outer segment 24b and the distal end of the outer segment 24b is connected to the perimeter support rod segment 25 for each of the at least two extension arms 24. The perimeter support rod segment 25 can attach to the outer segment 24b by a connector 26, which can be the same type of connector as connector 13, 15 or a different type of connector known to those of ordinary skill in the art. In another embodiment, a single extension arm (not shown) attaches to each connector 15 at the arm's center. In one embodiment, the extension arms 24 are the same diameter and construction as fiberglass tent poles. In another embodiment, the extension arms 24 are fiberglass tent poles. In one embodiment, the extension arms 24 attach to the main support rod 12 by bushings or bearing hinge pins or rivets. The cover 11 is attached using fasteners to the extension arms 24 so that the cover 11 becomes taut when the extension arms 24 are extended. In one embodiment, rather than accordion-like extension arms, the extension arms are similar to lengths of hollow fiberglass tent poles held together by elastic threaded through each of the lengths. Alternatively the tent poles segments can fit together with the proximal and distal end diameters of one greater than the other that one can insert inside the other to secure the segments together. In such an embodiment, the elastic holds the lengths together when the pole is extended, but the pole can be disassembled into its component lengths in the same way as a common tent pole.

In one embodiment, the stabilizer arms 21 can, optionally, extend at an angle of between 10 and 25 degrees downward from the main support rod 12 to hold the main support rod 12 above the roof of the golf cart. In such an embodiment, this provides an angle to the cover so that, when extended, the highest point of the cover 11 is along the main support rod 12 causing water to drain out from the center of the cover to the sides of the golf cart.

In one embodiment, as shown in FIG. 2, the extension arms 24 are attached to the underside of the main support rod 12 while the cover is attached to the upper side (the opposite side) of the main support rod 12. This configuration also creates a pitch or angle to the top of the cover 11 so that water will drain away from the main support rod 12. This configuration also allows the extension arms 24 to be on a single plane so that they can fold and unfold easily. In another embodiment (not shown), the extension arms angle upward from the main support rod 12 or from the edge of the golf cart roof to allow additional standing clearance underneath the ends of the cover 11 overhanging the sides of the golf cart. In such an embodiment, the device would channel water toward the center of the cover 11 and off the back of the golf cart. In another embodiment, the device would channel water toward the perimeter support rod segment 25 which is configured to collect and direct water off either the back or front of the golf cart depending on the orientation of the device on the golf cart roof. In another embodiment, the perimeter support rod segment is configured as groove, half circle or gutter to channel water from the sides of the cart to the back or front of the cover.

As further shown in FIG. 2, each of the stabilizer arms has at least one strap 22 attached to it. The straps are of sufficient length to wrap around the sides of the golf cart roof and fasten together on the underside of the golf cart roof. In one embodiment the straps are adjustable in length. In one embodiment, each strap 22 has a fastener on at least one end. In at least one embodiment, each strap 22 has a hook and loop closure on its loose end. Any type of fastener or attachment closure, such as Velcro, clips, or clip buckles, can be used on the straps 22 so long as the attachment closure can fasten the loose ends of the straps 22 together. In one embodiment, the stabilizer arms 13 can be held in place by straps, clamps, suction pads, suction cups or other suitable fasteners to keep the main support rod 12 from sliding away from the middle of the roof of the golf cart. In one embodiment a single adjustable strap is attached to a single stabilizer arm on one end, wrapped around the golf cart roof and attached to the opposite of the single stabilizer arm (embodiment not shown).

Figure 4:
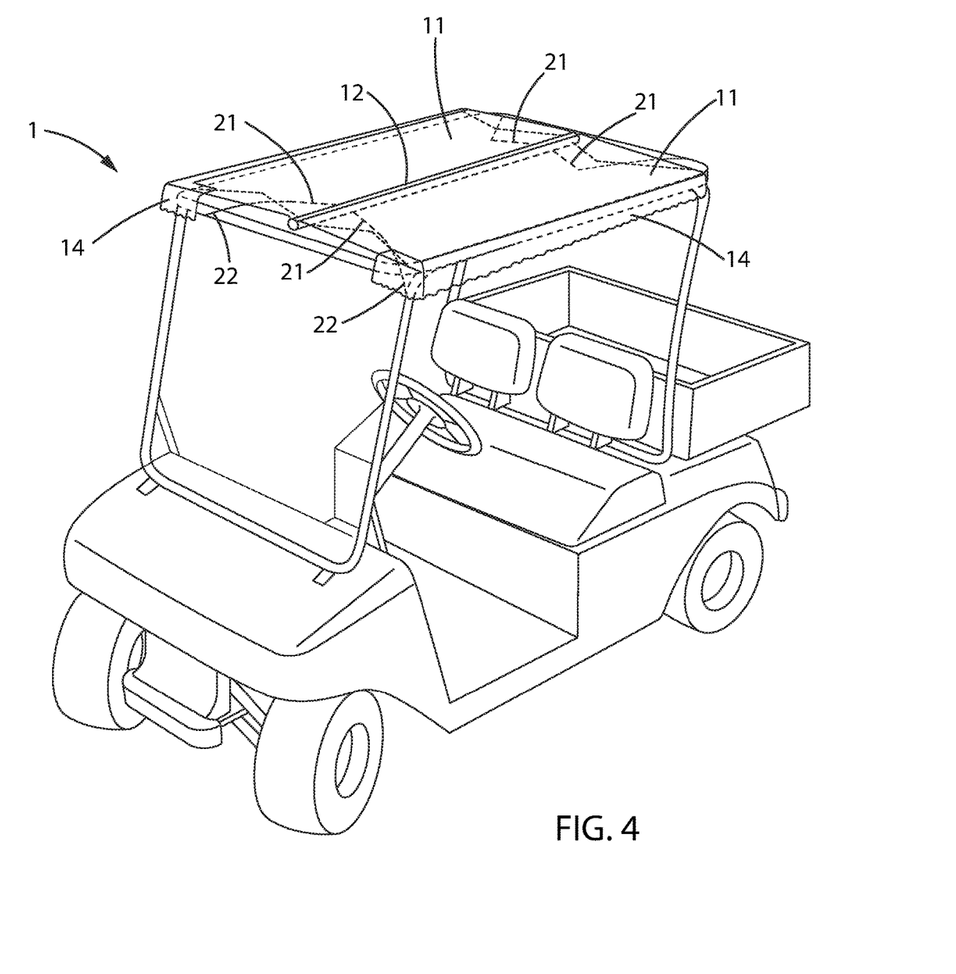
FIG. 4 is a perspective view of the partially extended device attached to a golf cart according to selected embodiments of the current disclosure.

As shown in FIG. 4, in one embodiment, the extension arms 24 can be extended partway so the cover does not hang over the sides of the cart or, in another embodiment, overhangs less than at full extension.

Figure 5:
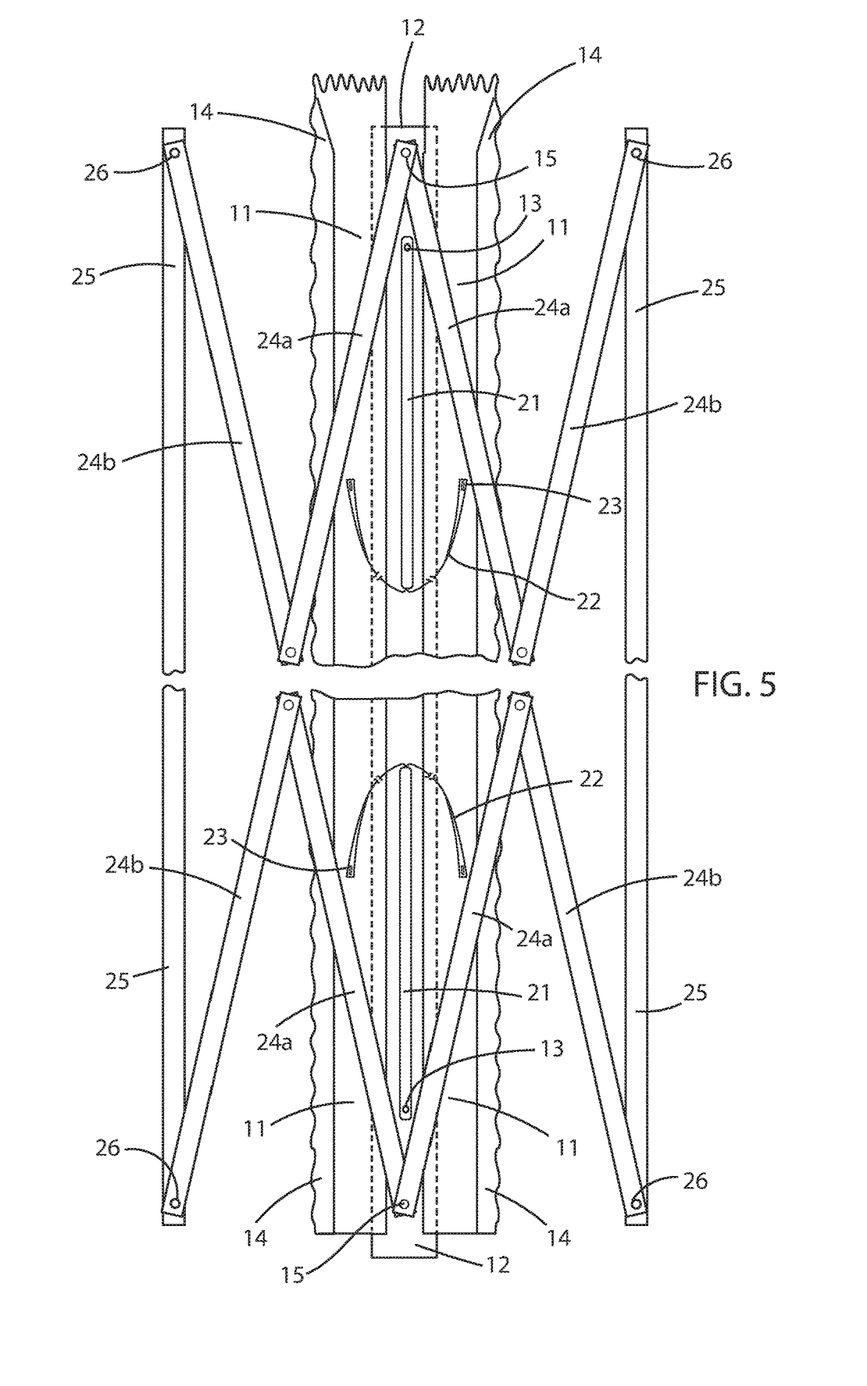
FIG. 5 is a top plan view of the device's main support bar and folded extension arms (without the cover) according to selected embodiments of the current disclosure.

As shown in FIG. 5, in one embodiment, the cover 11 is held in place across the golf cart's roof by a main support rod 12 that is approximately the same length as the cover 11. In one embodiment, the main support rod 12 is longer than the cover 11. The main support rod 12 has at least two attachment points for stabilizer connectors 13. In one embodiment, the stabilizer connectors 13 are positioned toward the ends of the main support rod 12. One stabilizer connector 13 can be positioned toward the forward end of the main support rod 12 and a second stabilizer connector 13 is positioned between 6 inches and 24 inches from the rear end of the main support rod 12. In another embodiment the stabilizer connectors 13 are positioned at an equal distance close to the ends of the main support rod 12 so the device has a universal front and rear orientation. The device can have stabilizer connectors 13 on the main support rod 12, which can rotate at the connectors 13 on main support rod 12 so that they are parallel to the main support rod 12 requiring less space for storage when the device 1 is removed from a golf cart.

In one embodiment, when the device is fully retracted it approximates the size of a large golf umbrella, having dimensions of approximately between 2 and 3.5 inches in diameter by approximately between 42 and 46 inches in length. In one embodiment, the device is designed to fit into the umbrella tube, slot, compartment or holder of a golf bag having a diameter of between 2 and 4 inches. In another embodiment, the device is between 0 and 144 inches in length to accommodate golf carts with a carrying capacity larger than two passengers.

The device is easy to deploy and use. The retracted device is placed on top of the roof of a golf cart. The stabilizer arms 21 are rotated to be perpendicular to the main support rod 12 and oriented underneath the main support rod 12. The main support rod 12 is placed on top of the golf cart's roof with the stabilizer arms 21 touching the roof. The main support rod 12 has a front end and a rear end. The front end of the main support rod 12 faces the general direction of the front of the golf cart and the rear end faces the general direction of the rear of the golf cart. The device can be positioned halfway between the sides of the roof of the golf cart (centered) and, in one embodiment, is supported by the stabilizer arms 21 so that the cover 11 only contacts the outside edge of the roof of the golf cart. When the device is positioned on the golf cart roof and is stabilized by the stabilizer arms 21, then the straps 22 are dropped over the sides of the golf cart's roof and passed underneath the golf cart's roof. The straps 22 connect to each other under the golf cart's roof by the fasteners 23 on the free ends of the straps 22.

In one embodiment, the free end of one strap 22 has both hook and loop Velcro portions on it and the end of the Velcro strap 22 passes through a looped end of the non-Velcro strap 22 on the opposite side of the roof. The Velcro strap 22 then folds on itself, fastened by the Velcro so that the two straps remain firmly attached to one another under the roof of the golf cart. In another embodiment, any suitable fastener can be used to attach the free ends of the straps 22 under the golf cart roof. For example, suitable fasteners can be buckles, side release buckles, magnetic release buckles, cams, cam buckles, strap adjusters, center release buckles, breakaway buckles, ratchets, ratchet joints, snaps, rivets, and clasps. In another embodiment (not shown), a strap having a looped end or other suitable fastener wraps under the golf cart roof and attaches to a hook or other corresponding fastener to hold the device securely to the golf cart roof.

Once the device is positioned and fastened to the golf cart roof, then the extension arms 24 can be lengthened until the cover is at the desired length or taut. In one embodiment, the extension arms 24 include a spring engaged locking mechanism to keep them in the extended position. In another embodiment, the locking mechanism has a push button ratchet joint that provides various locking positions so that the cover can be retracted and extended to various widths between fully retracted and fully extended, depending on user preference.

The device can be easily removed from a golf cart. In an embodiment with Velcro strap fasteners, extension arms 24 are fully retracted and the stabilizer arm 21 straps 22 are unfastened. Then the stabilizer arms 21 are rotated parallel with the main support rod 12 for storage. Once the cover 11 is completely retracted or crumpled to its fully retracted position (it will crumple for storage as the extension arms 24 retract), the straps can be wrapped around the retracted device to hold the cover 11, folded stabilizer arms 21, and folded extension arms 24 tightly against the main support rod 12. When fully retracted, the device can fit into a standard umbrella pocket on a golf bag for storage.

In an embodiment with tent pole type extension arms (not shown), the extension arms can be disassembled into their individual lengths and folded together for storage parallel to the main support rod. The tent poles can be constructed from aluminum, fiberglass, various plastics and polymers or any light weight material with suitable strength and flexibility. As the elastic inside the tent pole lengths keeps the lengths in the correct order, this can be a lightweight and easy to deploy version of the device. The elastic inside the tent pole extension arms can connect to the main support rod in a similar fashion as the extension arms.

In one embodiment, the stabilizer arms 21 can be omitted to reduce the size and weight of the device. In another embodiment, the extension arms 24 and the stabilizer arms 21 can be of a unitary construction to reduce the number of moving parts on the device.

In another embodiment the device can be permanently or semi-permanently fixed to the roof of a golf cart. In another embodiment the accordion like extensions covered in light weight material can be replaced with hardtop extensions such as but not limited to a clam shell design that folds open. Such an embodiment would no longer fit in the umbrella pocket of a golf bag but could remain on the golf cart roof or otherwise stored in close proximity to the golf carts themselves. In another hardtop embodiment the extensions can be foldable, pocket-like insets or slidable wings that in a closed position are within the border of the golf cart roof but in the open position extend beyond the roof line in a similar fashion to the portable device to provide similar protection from sun and rain to the golfers.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present invention. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. A rain and sun shield device comprising:
a main support rod, having an upper side and a lower side;
at least two stabilizer arms having a right and left side, each rotatably attached to the lower side of the main support rod;
at least two extension arms having an inner, an outer, and a perimeter support rod segment each segment having a proximal and distal end; wherein the proximal end of the inner segment is attached to the lower side of the main support rod and the distal end of the inner segment is connected to the proximal end of the outer segment and the distal end of the outer segment is connected to the perimeter support rod segment for each of the at least two extension arms;
a cover attached to the upper side of the main support rod and the perimeter outer support rod segments;
at least two straps having a proximal and distal end, wherein the proximal end of each strap is attached to the right and left side of each stabilizer arm and each distal end of each strap has a fastener to attach the distal ends of the at least two straps together;
wherein the device is placed on top and near center of a golf cart roof having a top, an underside, a front, a back, a left and a right side; said placement on the roof is along the lower side of the main support rod so the extension arms and cover can expand to overhang the roof of the golf cart up to about 24 inches on each side, and wherein the straps wrap around the sides of the golf cart roof and attach to each other on the underside of the golf cart roof to secure the device to the golf cart roof.

2. The device of claim 1, further comprising a valence that hangs vertically from the cover.

3. The device of claim 1, further comprising a valence that hangs vertically from the cover around the entire perimeter of the cover.

4. The device of claim 1, further comprising a valence that hangs vertically from the cover only along the sides of the cart.

5. The device of claim 1, further comprising a valence that hangs vertically from the cover along the sides of the cart and partially along the front and back sides of the cart.

6. The device of claim 1, wherein the unexpanded device has a diameter of between 2 and 3.5 inches.

7. The device of claim 1, wherein the device fits into a golf club bag umbrella slot.

8. The device of claim 1, wherein the cover is angled from the main support rod downward toward each side of the golf cart so that water will drain away from the main support rod.

9. A rain and sun shield device comprising:
a main support rod, having an upper side and a lower side;
at least two stabilizer arms having a right and left side, each rotatably attached to the lower side of the main support rod;
at least two tent poles having an inner, an outer, and a perimeter support rod segment each segment having a proximal and distal end; wherein the proximal end of the inner segment is attached to the lower side of the main support rod and the distal end of the inner segment is connected to the proximal end of the outer segment and the distal end of the outer segment is connected to the perimeter support rod segment for each of the at least two tent poles;
a cover attached to the upper side of the main support rod and the perimeter support rods;
at least two straps having a proximal and distal end, wherein the proximal end of each strap is attached to the right and left side of each stabilizer arm and each distal end of each strap has a fastener to attach the distal ends of the at least two straps together;
wherein the device is placed on top and near center of a golf cart roof having a top, an underside, a front, a back, a left and a right side; said placement on the roof is along the lower side of the main support rod so the tent poles and cover can expand to overhang the roof of the golf cart up to about 24 inches on each side, and wherein the straps wrap around the sides of the golf cart roof and attach to each other on the underside of the golf cart roof to secure the device to the golf cart roof.

10. The device of claim 9, further comprising a valence that hangs vertically from the perimeter of the cover.

11. The device of claim 9, wherein the unexpanded device has a diameter of between 2 and 3.5 inches.

12. The device of claim 9, wherein the device fits into a golf club bag umbrella slot.

13. A method for deploying a sun shield on a golf cart, the method comprising:
Placing a retracted device on top of a roof of a golf cart, the retracted device comprising:
at least two stabilizer arms, each attached to the lower side of the main support rod by a connector;
at least two extension arms, each attached to the lower side of the main support rod by a connector;
a cover attached to the at least two extension arms and to the upper side of the main support rod;
at least two straps, each attached to one of the at least two stabilizer arms;
at least two fasteners, each attached to one of the at least two straps;
wherein the cover is a rain and sun shield for a golf cart roof having a front, back, and left and right sides, and the device is placed on a golf cart roof along the lower side of the main support rod, and the extension arms expand the cover toward the left and right sides of the golf cart roof, and the at least two stabilizer arms support the device on top of the golf cart roof, and further wherein the straps and fasteners secure the device to the golf cart roof;
Rotating the stabilizer arms to a position generally perpendicular to the main support rod to support the device on top of the roof of the golf cart; Wrapping one of the at least two straps under the roof of the golf cart and attaching the fasteners together; and Extending the extension arms and cover to provide a shield from sun or rain.

* * * * *